(12) United States Patent
Ridley et al.

(10) Patent No.: US 7,578,182 B2
(45) Date of Patent: Aug. 25, 2009

(54) DETECTION OF PREPPED TIRES

(75) Inventors: J. Timothy Ridley, Newman, GA (US);
Kevin D. York, Buford, GA (US);
Robert O. Pellissier, Sunol, CA (US)

(73) Assignee: RKI Instruments, Inc., Union City, CA (US)

( * ) Notice: Subject to any disclaimer, the term of this patent is extended or adjusted under 35 U.S.C. 154(b) by 0 days.

(21) Appl. No.: 11/982,284

(22) Filed: Oct. 31, 2007

(65) Prior Publication Data

US 2009/0107228 A1   Apr. 30, 2009

(51) Int. Cl.
*G01M 17/02*   (2006.01)
(52) U.S. Cl. ..................................... 73/146
(58) Field of Classification Search ......... 73/146–146.8
See application file for complete search history.

(56) References Cited

U.S. PATENT DOCUMENTS 6,945,101 B2 * 9/2005 Wilson ....................... 73/146
7,100,435 B2 * 9/2006 Fujioka ...................... 73/146

* cited by examiner

*Primary Examiner*—Andre J Allen
(74) *Attorney, Agent, or Firm*—Imperium Patent Works LLP; T. Lester Wallace

(57) ABSTRACT

A portable tire prep detector is used to detect prep on a tire, when the tire is on a racing vehicle, and when the racing vehicle is on a race track. In one example, the detection of prep using the portable tire prep detector involves a test that takes less than two minutes. Multiple tires can be reliably tested in this way in rapid succession, even if some of the tires tested cause large amounts of prep to be drawn into the portable tire prep detector. In one example, the portable tire prep detector is a portable gas detector involving a catalytic combustion sensor. The portable gas detector is able to detect very low concentrations of hydrocarbons in a sample gas drawn into the detector from the tire surface. If the detector reads above a predetermined threshold value, then the tire is determined to have been prepped.

20 Claims, 1 Drawing Sheet

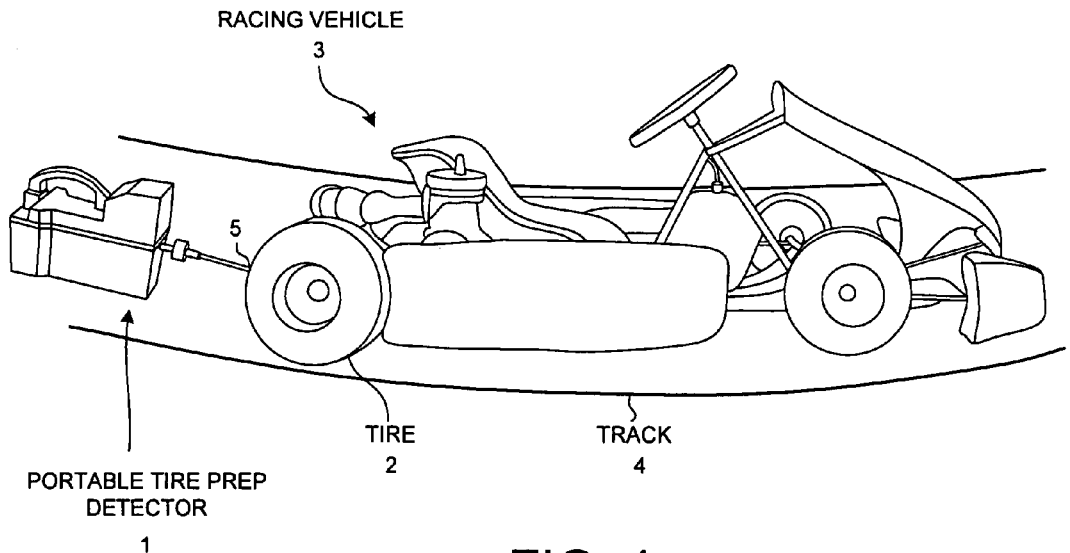
FIG. 1
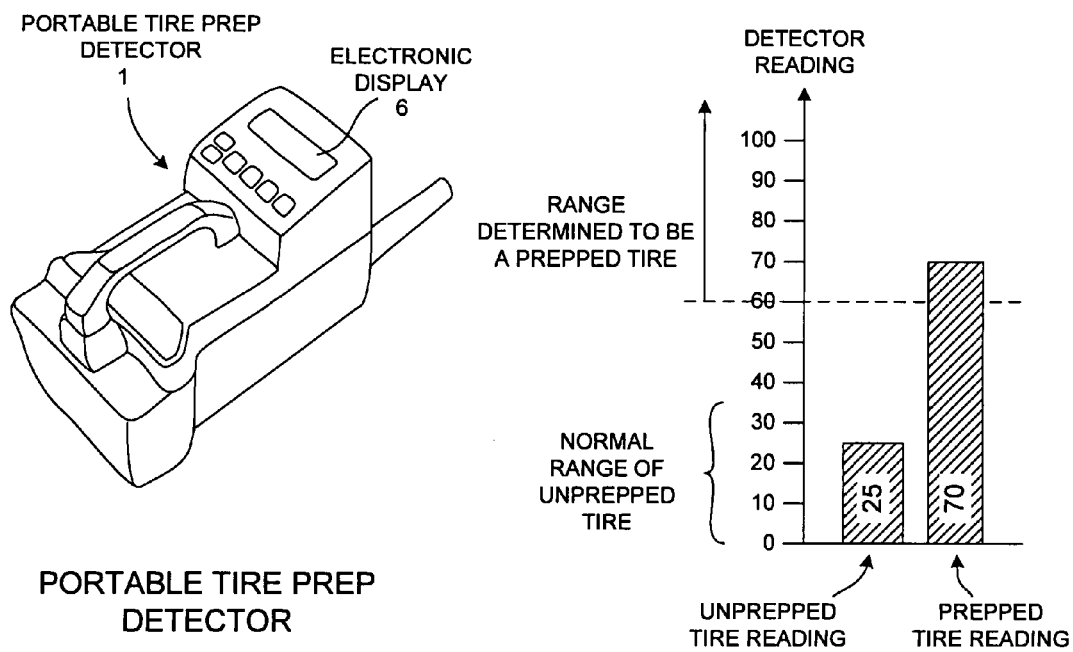
FIG. 2
FIG. 3

DETECTION OF PREPPED TIRES

BACKGROUND INFORMATION

In motor racing, from small amateur go cart races for teenagers up to NASCAR car races for professional race car drivers, the racing vehicles are generally required to use stock tires. It is often against racing rules to treat the stock tires with any chemicals or solvents that will soften the tires so as to improve the ability of the tires to adhere to the track. Allowing such treating of tires may give some racers an unfair advantage and may lead to other problems including pollution. Despite such prohibitions, a small industry has nevertheless developed that sells chemicals that can be absorbed into the rubber material of the tire, and will soften the rubber material of the tire. These chemicals, referred to here as "prep", generally involve mixtures of hydrocarbon liquids and/or other solvents that soften synthetic rubber. Racing organizations have been trying to develop techniques to catch individuals who are disregarding the racing rules and are cheating by treating their tires with prep.

For example, after particularly important races, tires of the winning vehicles are sometimes removed from the vehicles, and are shipped to a remote laboratory, and are then destructively tested using a gas chromatograph to test for the presence of prep. This type of testing is undesirably expensive and slow. It is desired that the testing be done on the spot at the track and not involve the destruction of the tires.

Accordingly, a handheld device called a durometer is sometimes used. The durometer does not actually detect tire prep, but rather measures the result of using tire prep on a tire, namely the resulting softness of the tire. To use a durometer, a track official typically presses the durometer against the tire such that the durometer compresses a small certain amount of rubber of the tire. The durometer indicates the amount of force required to carry out the compression. Use of durometers to detect tire prep has not been very satisfactory and many cheaters have managed to avoid detection. Some preps do not cause ordinary tire material to soften in a particular way that is detectable by the durometer. A durometer may not detect an unusually soft tire, yet the tire has nevertheless been treated and is significantly more porous and stickier than an untreated tire.

In fact, it has been so difficult to catch cheaters that some racing organizations have been only half heartedly attempting to enforce prohibitions on the use of prep. Many prep mixtures include constituents such as hexane, xylene, toluene, acetone, mineral spirits, paint thinner, transmission fluid, other hydrocarbons, toxic substances, carcinogenic-substances, and flammable substances. At a race track, once a cheater has applied prep to his/her tires, the cheater might be induced to dump the excess prep material on the ground or down a drain in order to avoid being caught with the illicit material. Such dumping causes pollution around the race track and may require the race track to engage in a costly cleanup.

One way of preventing the use of prep is to require racers to purchase a set of racing tires at the track. These tires, once purchased, must be put on the racing vehicle in plain sight, and then the vehicle with the purchased tires is made to enter the race. Due to the open visibility of the tire during this entire process, it is difficult for a cheater to apply prep without being detected. Although this technique can be practiced in auto races of well-known racing organizations where professionals are involved, requiring ah amateur racer with less financial backing to purchase a new set of new tires before each race can be prohibitive. An amateur go cart racer may not be able to afford purchasing a new set of tires every weekend when the racing is only done for recreational purposes. A technique of keeping people from cheating without having to force all racers to buy new tires prior to each race is desired.

Moreover, even at high visibility professional races of national importance, a prepping problem may still occur. Despite the fact that the race teams are required to buy new stock tires at the race track, and despite the fact that race teams are required to put the purchased tires on their race cars in plain sight, each racing pit typically has its own air compressor to inflate tires. Some cheaters have reportedly gone to the trouble of modifying their air compressor so that the outer visible tank includes an inner tank. The inner tank includes prep. As the tire is inflated in the pit using the air compressor, prep from the inner tank is secretly injected into the stock tire. The injected prep then serves to soften the tire from the inside out as the race proceeds, thereby giving the race team an unfair advantage. An inexpensive and reliable technique for detecting tires treated with tire prep is desired.

SUMMARY

In a novel method, a portable tire prep detector is used to detect prep on a tire and/or emanating from a tire. In one example, the prep is on a tire that is on a racing vehicle (for example, a go cart or race car), and the racing vehicle is at, near and/or on a race track. The detection of prep using the portable tire prep detector involves a test that takes only two minutes or less to perform. Multiple tires can be reliably tested in this way for prep on the race track using the portable tire prep detector, even if some of the tires tested are exhibiting or emanating high concentrations of prep.

In one example, the portable tire prep detector is a portable, battery-powered, gas detector involving a catalytic combustion sensor. The portable gas detector is able to detect very low concentrations of hydrocarbons in a sample gas drawn into the detector from the tire surface. The portable gas detector may, for example, measure and display hydrocarbon concentrations in air from zero parts per million (PPM) up to a large number such as 100 PPM, in increments of five PPM. In one advantageous aspect, the readings output from the portable tire prep detector are not accurate PPM concentrations, but are nonetheless usable to determine whether hydrocarbon concentrations from a tire under test are above or below a predetermined threshold value. If the tire is tested to generate a reading above the predetermined threshold value, then the tire is determined to have been prepped. If, on the other hand, the tire is tested to generate a reading below the predetermined threshold, then the tire is determined not to have been prepped. Keeping the actual concentration that will result in a tire being deemed to have been prepped a secret, and using decalibrated portable gas detectors at the race track to perform official prep tests, helps prevent cheaters from designing protocols to get prepped tires to test below the predetermined threshold.

Further details and embodiments are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 1 is a diagram of a novel method whereby a portable tire prep detector 1 is used to detect prep on a tire 2 and/or emanating from tire 2.

FIG. 2 is a perspective view of the portable tire prep detector 1 of FIG. 1. The portable tire prep detector is a portable gas detector that involves a catalytic combustion sensor.

FIG. 3 is a chart that illustrates two ranges of readings: 1) a first range (>60) that indicates a prepped tire, and 2) a second range (<60) that indicates a tire that has not been prepped.

DETAILED DESCRIPTION

FIG. 1 is a diagram of a novel method. A portable tire prep detector 1 is used to detect tire prep. The tire prep is either on a tire 2 and/or is emanating or outgassing from tire 2. Portable tire prep detector 1 may, for example, be a portable gas detector that weighs less than fifty pounds and that detects the gaseous form of one or more components of the tire prep material. Although there are many different types of tire prep material, most tire prep materials include flammable constituent materials such as hydrocarbons. Accordingly, the portable gas detector may be a type of sensitive gas detector that detects the flammable materials using a catalytic combustion sensor. When the flammable material burns on the sensor, electrical characteristics of the sensor change and are detected and measured by circuitry within the portable gas detector.

FIG. 2 is a perspective view of portable gas detector 1 in FIG. 1. This particular detector, called the "JTR Eagle Tire Sniffer", is available from www.jtreagle.com and is manufactured by RKI Instruments Inc. of Union City, Calif. This portable gas detector is capable of detecting low levels of hydrocarbon gases down to zero parts (of flammable molecules) per million (PPM) (with respect to parts of non-flammable gas). The portable gas detector makes measurements in five PPM increments starting at 0 PPM. The portable gas detector displays results of the measurements on an electronic display 6. The portable gas detector has an adequately fast response time and adequately fast recovery time to be able to make more than one tire prep test each two minutes where an initial level of flammable gas measured exceeds 100 PPM and where the level of flammable gas measured in the subsequent measurement is in the 15 PPM range. The gas detector does not saturate with flammable gas from the first test and does not fail to perform the second test. The second test in the 15 PPM range is not adversely affected by the earlier test.

In the example of FIG. 1, as racing vehicle 3 moves up to a starting area at race track 4, a track official uses the hand-held portable gas detector 1 to test tire 2 of vehicle 3. The track official presses an input 5 of portable gas detector 1 against the tire 2 so that the portable gas detector draws in an amount of sample gas from the surface of tire 2. A sample of gas may be released from inside tire 2 and may be tested as well. If the portable gas detector reads more than a predetermined threshold value, then the track official determines that tire 2 has been prepped. If this is an infraction of racing rules, then the vehicle and driver may be prohibited from racing in the race. If, on the other hand, portable gas detector 1 reads less than the predetermined threshold value, then tire 2 is determined not to have been prepped. With a single portable gas detector, multiple vehicles can be tested by the track official in this manner, one after another, at the rate of at least one or more vehicles every two minutes. As each vehicle approaches a starting area at the track, a tire or multiple tires of the vehicle are tested shortly before the vehicle is allowed onto the track to race.

Although a "JTR Eagle" brand of portable gas detector is illustrated in the example of FIG. 1, any suitable portable tire prep detector can be used. In the example above in which a JTR Eagle gas detector is used, the threshold value reading may be set by decalibrating the detector so that the gas detector is more sensitive than is normal in other commercially available Eagle brand detectors. Accuracy of the actual PPM readings is not important, but rather the sensitivity and repeatability of the measurement is important. Clean fresh new tires that are hot due to recent use on the track are then tested. Measurements of these new hot tires are made using the sensitive portable tire prep detector, and the resulting readings are recorded. In one specific example, readings were obtained and fell within a range of readings from zero to 35.

In addition to determining this baseline range of readings for unprepped tires, measurements are made of tires that have been prepped. Some cheaters have committed significant time to developing involved protocols for applying prep and curing treated tires so that the amount of prep outgassing from the tires is minimized at the time of testing. A baseline of reading for prepped tires may be determined by obtaining such tires, making measurements of these tires using the same decalibrated portable tire prep detector 1 used to develop the baseline range for unprepped tires, and recording the obtained readings. In one specific example, readings were obtained that fell within a range of readings that extended down to 60.

Using two sets of measurements, the threshold reading value is determined. In one specific example, the threshold value is set to be a reading of 60 for an uncalibrated JTR Eagle catalytic combustion sensor detector. Depending on how the detector has been decalibrated, this reading corresponds to different actual PPM values. For example, a reading of 60 may correspond to an actual PPM level of approximately 15 PPM. In actual practice, the actual threshold value used by the track official on a particular day can be changed on site at the track to account for environmental characteristics that affect readings such as, for example, different track surfaces, air temperatures, and humidities.

The portable gas detector described above uses a catalytic combustion sensor. To facilitate rapid response time and rapid recovery time, care is taken to eliminate surfaces within the detector that can absorb heavy hydrocarbons from a prior measurement sample. Care is also taken to reduce the volume of the input tubing and sample chamber. The sample gas is received through a short amount of teflon tubing that does not absorb the heavy hydrocarbon constituents of typical prep. The gas flows through a dust filter, and then flows directly into an aluminum combustion chamber and to a flame arrester and detector in the chamber. The pump that pulls the sample gas into the chamber is disposed downstream of the sensor so the pump interior surfaces do not absorb hydrocarbons for later outgassing into the combustion chamber. Due in part to the small and nonabsorbent interior surfaces, and due to the pump being downstream of the sensor, the portable gas detector 1 can make at least one reliable and repeatable prep test each two minutes. Even if a first prep test involves a heavy dose of prep resulting in a reading in excess of 100 PPM, the portable gas detector 1 can make a second sensitive and reliable reading of a sample gas having only a slight amount of prep such as, for example, a sample having less than 15 PPM of flammable hydrocarbons.

Although the portable tire prep detector 1 of FIG. 1 is a portable gas detector that involves a catalytic combustion sensor, other suitable portable tire prep detectors can be employed in the novel method. For example, a portable tire prep detector involving any one of the following types of sensors can be employed: a photo ionization sensor, a metal oxide semiconductor sensor, a catalytic semiconductor sensor, an FID (flame ionization) sensor, and an ion mobility sensor. Sensors also could be combined with a portable GC (gas chromatograph) to detect specific chemicals. Portable tire prep detector 1 may be a portable mass spectrometer or a portable chemical analysis detector. Absorption spectroscopy can be used to detect prep in a portable tire prep detector. The term portable tire prep detector embraces and encompasses all these techniques as well as any other suitable technique.

In a novel method, a standard portable gas detector is commercially and widely available. A cheater sees a portable gas detector being used at a race track to test for the illicit use of prep. The portable gas detector being used appears to be the same type of portable gas detector that is available on the market due to the similar outward appearance of the two detectors. The cheater notices or otherwise learns the numerical threshold value that is deemed by racing officials to indicate an unprepped tire. The cheater then obtains and uses a commercially available version of the portable gas detector to test his prepped tires and to develop a protocol that reduces the detector readings for prepped tires below the numerical value. When the cheating racer then goes to the race track and has his/her tires officially tested, however, the prepped tires test to have higher numerical values and the cheater is caught. The reason for the increased readings is that the version of the portable gas detector used at the track is decalibrated to be more sensitive than the commercially available version of the portable gas detector. Readings of the version used by the racing officials are, in one example, approximately four times as large as readings of identical samples measured with the commercially available version of the gas detector. If the threshold level being used can be concealed from cheaters, then the cheaters will have a more difficult time in designing protocols that result in prepped tires testing to have acceptable gas detector readings.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
    using a portable hand-held device to detect tire prep material on a tire without destroying the tire.

2. The method of claim 1, wherein the portable hand-held device is a portable gas detector.

3. The method of claim 1, wherein the tire is on a vehicle, and wherein the vehicle is on a race track.

4. The method of claim 1, wherein the portable hand-held device weighs less than fifty pounds.

5. The method of claim 4, wherein the portable hand-held device can perform at least one test for tire prep material each two minutes.

6. The method of claim 1, wherein the tire prep material includes a material taken from the group consisting of: a hydrocarbon, mineral spirits, transmission fluid, acetone, xylene, toluene, hexane, paint thinner.

7. The method of claim 1, further comprising:
    repeatedly using the portable hand-held device to test tires on numerous vehicles for the presence of tire prep material, wherein the portable hand-held device is adapted to make the repeated tests at a rate that exceeds one test per every two minutes.

8. The method of claim 1, wherein the portable hand-held device has an electronic display.

9. The method of claim 1, wherein the portable hand-held device includes a catalytic combustion sensor.

10. The method of claim 1, wherein the portable hand-held device includes a sensor taken from the group consisting of: a catalytic combustion sensor, a metal oxide semiconductor sensor, a catalytic semiconductor sensor, a photo ionization sensor, a flame ionization sensor, and an ion mobility sensor.

11. A method comprising:
    using a portable tire prep detector to detect tire prep material on a tire, wherein the detection does not involve the destruction of the tire.

12. The method of claim 11, wherein the portable tire prep detector is a portable gas detector that draws in a gas and displays a number, wherein the number is indicative of a concentration of a combustible material in the gas, and wherein the portable prep detector draws in the amount of the sample gas through an intake port that is placed against or near the tire.

13. The method of claim 11, wherein the tire is attached to a vehicle, and wherein the vehicle is at a race track.

14. The method of claim 11, wherein the portable tire prep detector includes a catalytic combustion sensor.

15. The method of claim 11, wherein the portable tire prep detector can determine whether an amount of gas has a measurable prep constituent that has a concentration of less than a predetermined threshold concentration, and wherein the portable tire prep detector can make such determinations at a rate of at least one determination every two minutes.

16. The method of claim 15, wherein the predetermined threshold concentration is a value less than approximately 15 parts per million (PPM).

17. The method of claim 16, wherein the portable tire prep detector displays a concentration reading that is inaccurate.

18. An apparatus comprising:
    means for detecting tire prep material emanating from a tire, wherein the means is portable and weighs less than fifty pounds and is battery-powered, wherein the detecting does not involve the destruction of the tire, and wherein the means is for making repeatable tests for tire prep material at a rate of at least one test per every two minutes; and
    an electronic display that displays a result of the detection.

19. The apparatus of claim 18, wherein the apparatus is a hand-held portable gas detector, and wherein the tire prep material includes a hydrocarbon.

20. The apparatus of claim 18, wherein the result is a number, and wherein the number is indicative of a concentration of a flammable gas in a sample of gas taken from a surface of the tire.

* * * * *